UNITED STATES PATENT OFFICE.

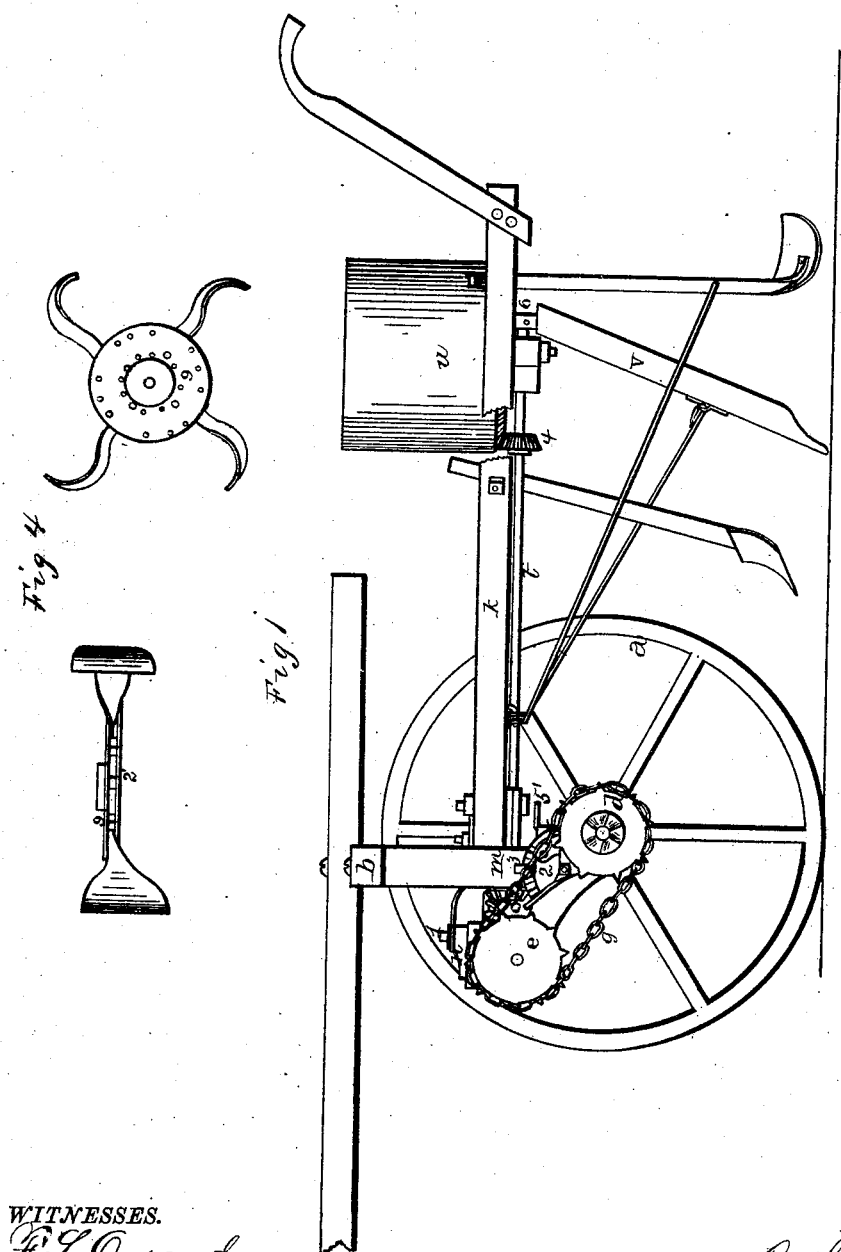

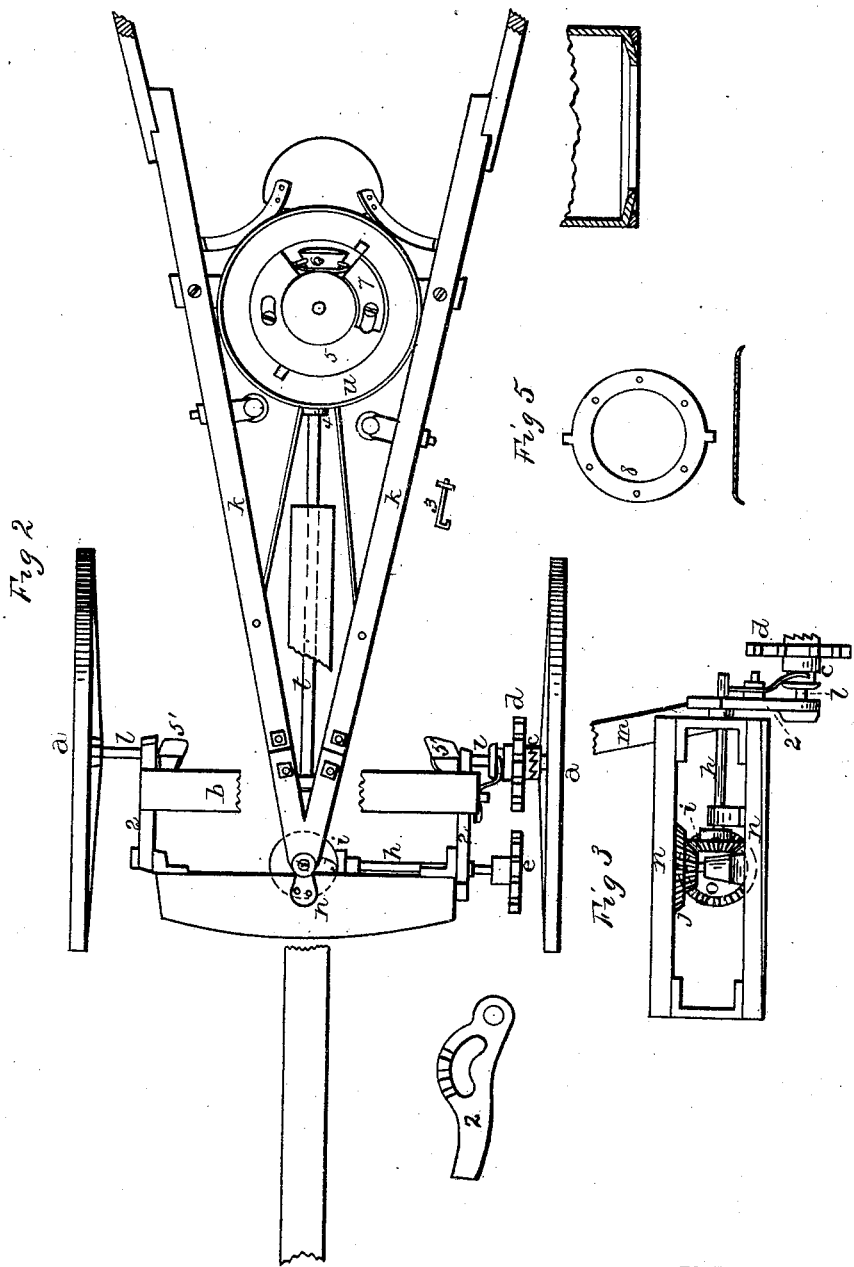

CORNELIUS H. NIXON, OF POLO, ILLINOIS.

IMPROVEMENT IN COTTON-PLANTERS.

Specification forming part of Letters Patent No. 144,784, dated November 18, 1873; application filed August 21, 1873.

*To all whom it may concern:*

Be it known that I, CORNELIUS H. NIXON, of Polo, in the county of Ogle and in the State of Illinois, have invented certain new and useful Improvements in Cotton-Planter; and do hereby declare that the following is a full, clear, and exact description thereof, reference being had to the accompanying drawings and to the letters of reference marked thereon, making a part of this specification.

The nature of my invention relates to an improvement in combined seed-planters and cultivators; and it consists in the arrangement and combination of parts which will be more fully described hereafter.

Figure 1 is a side elevation of my invention. Fig. 2 is a plan view of the same. Fig. 3 is a front view of the gearing by which the shaft operates the seeding devices and the revolving plow for thinning out cotton. Fig. 4 is a detached view of the revolving plow or cutter alone. Fig. 5 represents a plate used in the bottom of the hopper when planting corn.

$a$ represents the two ground-wheels, upon which the frame $b$ is supported, to which the tongue and seeding and cultivating devices are attached. Upon the inside of one of these wheels are formed ratchet-teeth, which engage with the clutch $c$, upon which is formed the spur-wheel $d$, which drives a second spur-wheel, $e$, by means of the chain $g$. To the inner end of the shaft $h$, to which the wheel $e$ is secured, is fastened a bevel-gear, $i$, which gears with a beveled wheel, $j$, placed upon the pivot-pin 1, which binds the beams $k$ to the frame $b$. The axles $l$, upon which the ground-wheels revolve, are either cast with or secured to the notched plates 2, secured to the lower ends of the standards $m$ by means of any suitable devices, 3, and which plates can be so adjusted as to raise the frame $b$ up from, or lower it down to, the ground. Between the front ends of the plates are pivoted the cross-pieces $n$, to which the front ends of the beams $k$ are pivoted, the double pivot giving the beams a free universal movement.

The wheel $j$ has two sets of gears, the smaller one of which meshes with the gear $i$, while the larger one meshes with the gear $o$ on the shaft $t$. Near the rear end of the shaft is placed the bevel-gear 4, which meshes with the teeth formed upon the under side of the hopper $u$, and revolves it freely around.

The bottom of the hopper is formed by the plate 5, having an opening through its rear end, through which the teeth on the feed-cylinder 6 project, and draw the cotton or other seed down into the shoe V. The size of this seed-hole can be regulated at will by means of the circular slotted plate 7, which can be moved around so as to close it more or less.

When it is desired to plant corn, the slotted plate 7 and the cylinder 6 are both removed, and the circular plate 8, having two ears formed on its sides to catch in corresponding recesses in the bottom of the hopper, is put in their place, the plate being held down by a cap which passes over its top, but allows it to revolve freely with the hopper.

Just back of the shoe is a covering device of any suitable kind, secured to the beams K by slotted standards, which can be regulated up and down according to the depth which it is desired to cover the seeds.

When it is desired to thin out cotton, the hopper and feed-cylinder are both removed, and the revolving cutter (shown in Fig. 4) is placed upon the end of the shaft $t$, in place of the cylinder. This cutter consists of the perforated plate 9, having secured to one side the ring $2'$, which is held at a suitable distance from the plate by projections of any suitable kind placed between them. In the openings thus made around the edge of the plate the shanks of the cutters are inserted and bolted in position.

To the standards $m$ are secured common clevises $5'$, to which plows or cultivators can be attached for plowing.

Having thus described my invention, I claim—

1. The combination of the standards $m$ $m$, axles $l$ $l$, notched plates 2 2, clamps 3 3, and pivoted cross-frame $n$, as and for the purposes herein set forth.

2. The combination of the axles $l$, wheels $d$ $e$, chain $g$, shaft $h$, gears $i$ $j$ $o$, universal-joint shaft $t$, wheel 4, and slotted rotating hopper $u$, with feed-cylinder 6, all constructed and arranged substantially as and for the purposes herein set forth.

In testimony that I claim the foregoing I have hereunto set my hand this 30th day of July, 1873.

CORNELIUS H. NIXON.

Witnesses:
 J. F. WILKINS,
 R. D. BREMER.